No. 861,666. PATENTED JULY 30, 1907.
J. MERRITT.
APPARATUS FOR ASSEMBLING AND DISASSEMBLING FLEXIBLE TUBES.
APPLICATION FILED DEC. 29, 1906.
3 SHEETS—SHEET 1.
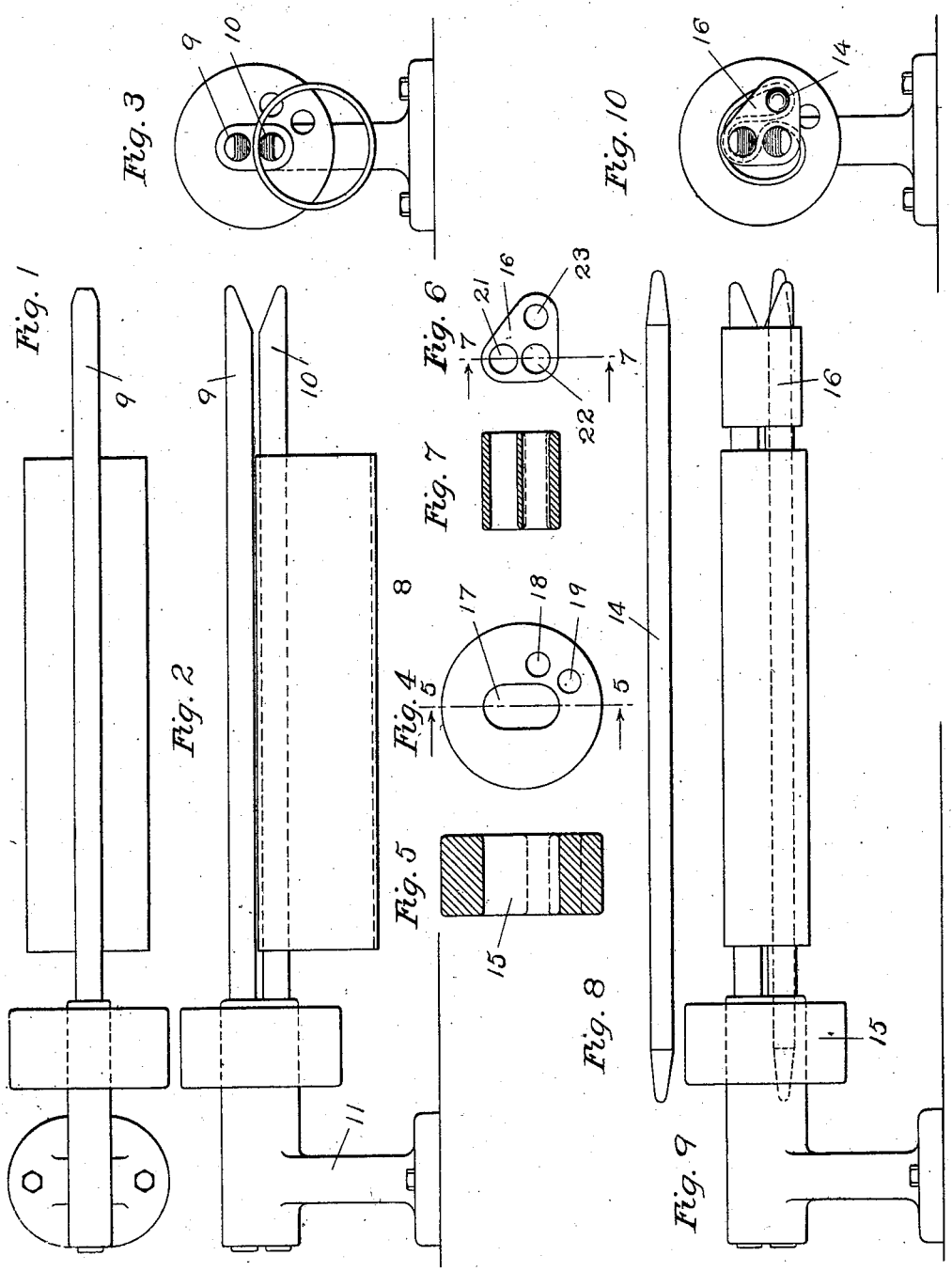
Witnesses:
Inventor:
Joseph Merritt
By W. H. Horniss, Atty No. 861,666. PATENTED JULY 30, 1907.
J. MERRITT.
APPARATUS FOR ASSEMBLING AND DISASSEMBLING FLEXIBLE TUBES.
APPLICATION FILED DEC. 29, 1906.
3 SHEETS—SHEET 2.
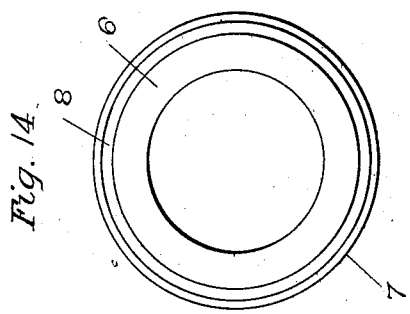
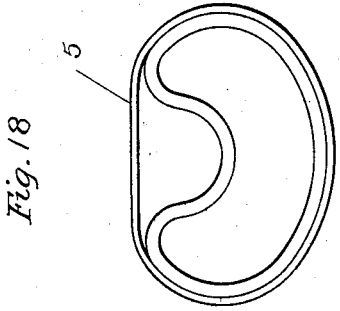
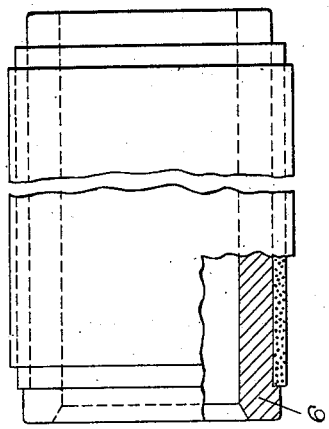
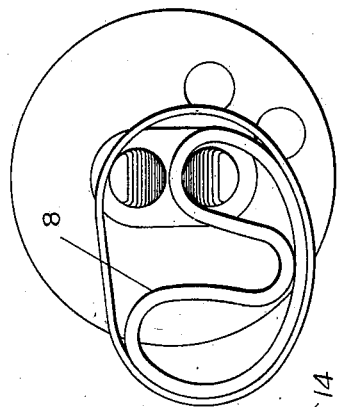
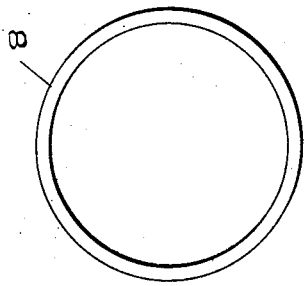
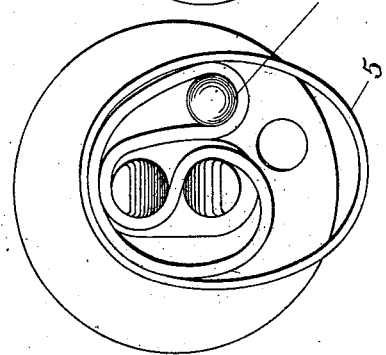
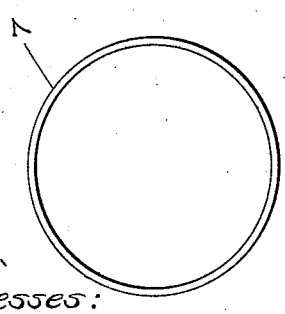
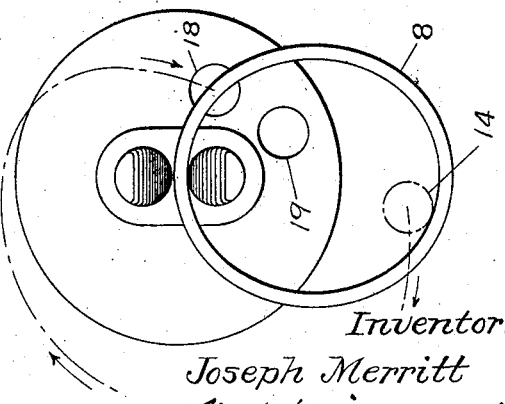
Witnesses:
Inventor.
Joseph Merritt
By Wm H Honiss. Atty No. 861,666. PATENTED JULY 30, 1907.
J. MERRITT.
APPARATUS FOR ASSEMBLING AND DISASSEMBLING FLEXIBLE TUBES.
APPLICATION FILED DEC. 29, 1906.
3 SHEETS—SHEET 3.
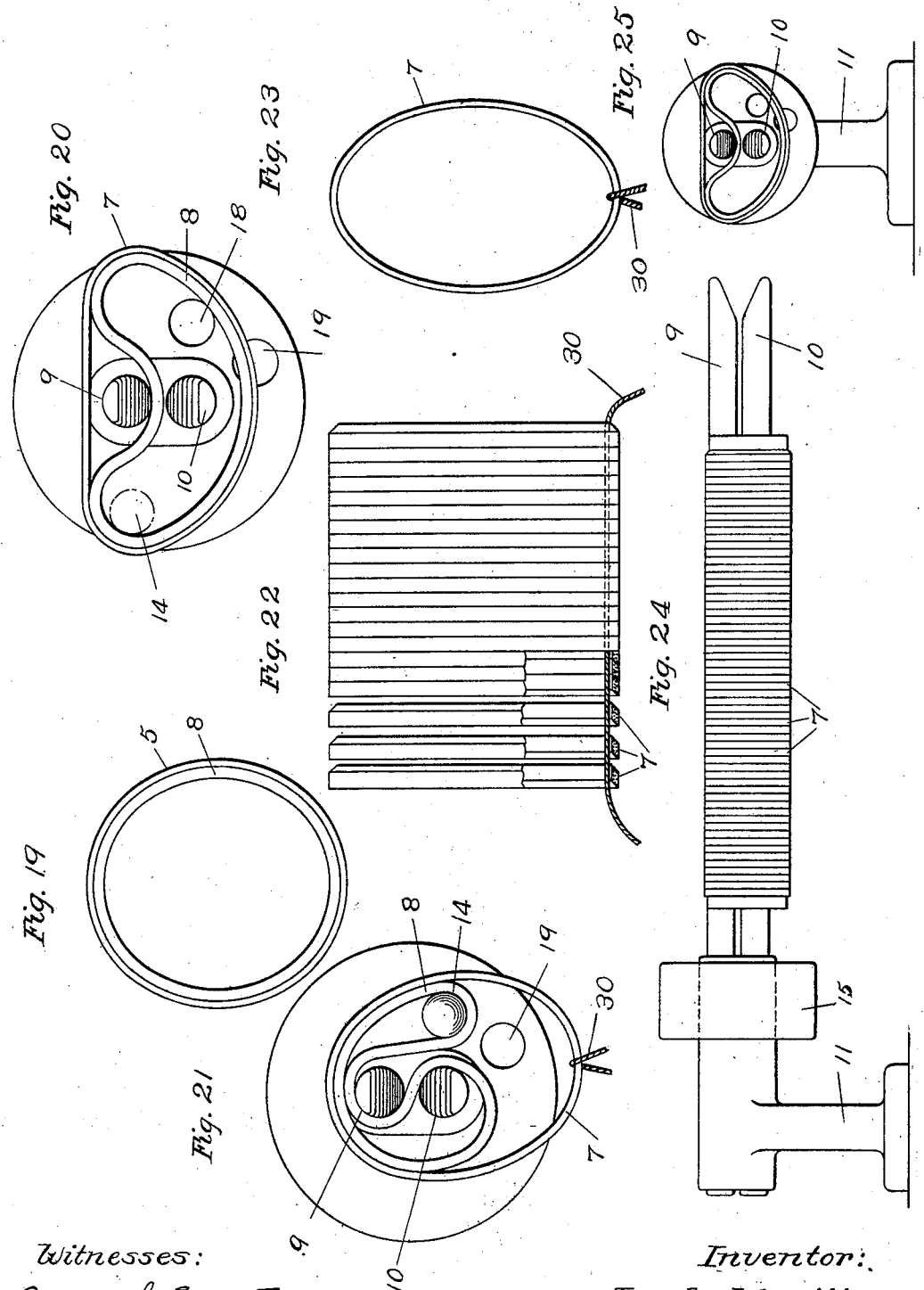
Witnesses:
Inventor:
Joseph Merritt
By _____, Atty

UNITED STATES PATENT OFFICE.

JOSEPH MERRITT, OF HARTFORD, CONNECTICUT, ASSIGNOR, BY DIRECT AND MESNE ASSIGNMENTS, OF ONE-HALF TO BEECH-NUT PACKING COMPANY, OF CANAJOHARIE, NEW YORK, A CORPORATION OF NEW YORK, AND ONE-FOURTH TO WILLIAM A. LORENZ AND ONE-FOURTH TO WILLIAM H. HONISS, BOTH OF HARTFORD, CONNECTICUT.

APPARATUS FOR ASSEMBLING AND DISASSEMBLING FLEXIBLE TUBES.

No. 861,666.  Specification of Letters Patent.  Patented July 30, 1907.

Application filed December 29, 1906. Serial No. 349,964.

*To all whom it may concern:*

Be it known that I, JOSEPH MERRITT, a citizen of the United States, and a resident of Hartford, in the county of Hartford and State of Connecticut, have invented certain new and useful Improvements in Apparatus for Assembling and Disassembling Flexible Tubes, of which the following is a full, clear, and exact specification.

This invention is an improved apparatus for the assembling and disassembling of flexible tubes or sleeves.

The embodiment of this invention herein shown and described is adapted for use in the manufacture of rubber gaskets of the form generally employed for hermetic sealing of cans, jars and other receptacles commonly employed for the packing of food products.

Figure 1 of the drawings is a plan view, Fig. 2 is a side view, and Fig. 3 is an end view of the portion of the apparatus, showing a flexible sleeve supported thereon ready for the contracting or collapsing operation. Fig. 4 is an end view, and Fig. 5 is a side view, in cross section taken on the line 5—5 of Fig. 4 of the yoke shown in the previous figures, detached from the apparatus. Fig. 6 is an end view and Fig. 7 is a side view in section taken on the line 7—7 of Fig. 6, of the smaller yoke employed for holding the outer ends of the sleeve collapsing rods, in their closed or sleeve-collapsing position. Fig. 8 is a side view of the movable sleeve-collapsing member employed in conjunction with the apparatus shown in Figs. 1, 2 and 3. Fig. 9 is a side view and Fig. 10 an end view of the apparatus and the sleeve of Figs. 1, 2 and 3, showing the sleeve coiled or looped in its contracted position and held in that position by the two yokes of Figs. 4 and 6. Figs. 11 and 12 are end views of the gasket tube and sleeve respectively, which are shown in the succeeding figures, illustrating the operation of the device. In these and in all the succeeding figures, excepting Figs. 24 and 25, the parts are shown in an enlarged scale as compared with the scale of the previous figures. Fig. 13 is a side view and Fig. 14 an end view of the gasket tube of Fig. 11, mounted upon the sleeve of Fig. 12; and both together mounted upon a mandrel such as may be employed for cutting the gasket tube into gaskets, during the interval between the assembling and disassembling operations for which the apparatus of the present invention is particularly intended. Fig. 15 is an end view, showing the sleeve supported in position preliminary to the coiling or contracting operation. Fig. 16 is a similar view, showing the sleeve coiled and held in its contracted position; and the tube of Fig. 11 slipped into place. Fig. 17 is a similar view, showing the approximate action of the gasket tube and sleeve in being released from the apparatus. Fig. 18 is an end view of the gasket tube and its sleeve when removed from the apparatus. Fig. 19 is an end view, showing the tube and sleeve of Fig. 18 in the fully expanded cylindrical condition occupied by them while upon the cutting mandrel shown in Figs. 13 and 14. Fig. 20 is an end view, showing the sleeve and its gasket sleeve, now cut into gaskets, as shown in Fig. 24 and placed again upon the apparatus in readiness for the second contracting operation, to facilitate the removal of the cut gaskets. Fig. 21 is a similar end view, showing the sleeve fully collapsed, in a condition similar to its prior collapsed condition of Fig. 16. Fig. 22 is a side view, and Fig. 23 an end view, showing a number of the completed gaskets removed from the sleeve and strung together. Fig. 24 is a side view and Fig. 25 is an end view, both in reduced scale, further illustrating the employment of the apparatus of the previous figures for collapsing the sleeve to remove the cut gaskets.

The apparatus shown in the drawings is adapted to perform intermediate operations in the manufacture of rubber gaskets from tubes of gasket material, like the tube 5 shown in the figures. By the methods of manufacture to which the present invention relates, these tubes are mounted upon mandrels which are then rotated while the gaskets are cut from the tube by a succession of circumferential cuts penetrating the wall of the tube, either at right angles with its axis when making gaskets having a rectangular cross-section, or at an angle with that axis in making acute angled gaskets like those shown in this application.

The constrictive action of the tube due to its elasticity is utilized by expanding it and pushing or pulling it over a mandrel of a diameter larger than the normal diameter of the tube. This mounting operation involves obvious difficulties, due to the flexible and elastic character of the gasket material. The constrictive action of the tube around the mandrel surface interferes with the free distribution of the material and holds it in a more or less unequally distributed condition while being cut, with the result that the material more or less unequally changes its form as the strains are released by the cutting away of the successive rings, thereby producing gaskets that are irregular in size or contour. Moreover, on account of the clinging and elastic character of the gasket material, it is necessary to have the gasket cutting tool, which is extremely thin and sharp, entirely penetrate the wall of the tube in order to insure complete separation of the gaskets, thus bringing the cutting edge of the tool against or into the surface of the mandrel, and the repeated cuts of the tool score and roughen that surface, thereby increasing the difficulty of drawing or pushing or otherwise mounting the gasket tubes thereon. This roughness, and the clinging character of the gasket material also interfere materially with the expeditious removal of the cut rings from the mandrel. Any attempt to remove the cut gaskets wholesale or several at a time from the mandrel is resisted by the clinging action of the several gaskets, each acting independently; and their combined resistance is still greater when of the acute angled form shown herein, because of the fact that their interlapping conical faces tend to telescope and wedge each other when attempts are made to push them longitudinally of the material. The method of manufacture to which the apparatus of the present invention is adjunctive avoids these difficulties by employing a flexible sleeve or lining, which is made removable from the mandrel, and serves as a vehicle for the tube and the cut gaskets. The tube and its sleeve are first assembled apart from the mandrel, and without stretch, by the apparatus shown in the present invention. Then the assembled tube and sleeve are expanded circumferentially, preferably by inflation, and settled uniformly upon the mandrel by other apparatus not herein shown. Then the tubes are separated into gaskets by still other apparatus. Then the sleeves with the cut gaskets thereon are bodily removed from the mandrel, preferably by use of the inflating apparatus referred to. Then the apparatus of the present invention is again employed for coiling or collapsing the sleeves to permit the easy removal of the cut gaskets therefrom.

The sleeves 8 are supported by means of projecting rod members 9 and 10 which are inserted in or appurtenant to a standard 11, which may be fastened to a bench or table, or in any convenient relation to the other apparatus, of which it may be an adjunct. The rods 9 and 10 extend longitudinally of the sleeve 8, one on the outer side and one on the inner side of the wall of the sleeve, so that when the apparatus stands horizontally as herein shown the sleeve hangs upon one of the rods as shown in Figs. 2 and 3. These rods serve to support the sleeve while it is coiled and contracted by means of the movable contracting member 14, which is preferably made in the form of a round rod, similar to the rods 9 and 10.

In order to hold the contracting rod 14 into its sleeve contracting position, the yokes 15 and 16 are provided. The yoke 15 is appurtenant to the standard 11, being preferably made removable therefrom to permit of the substitution of other yokes for other sizes of tubes. It is herein shown as being provided with an elongated central opening 17, fitting over the end of the standard 11. This yoke is also provided with seats 18 and 19, for receiving the left hand or inner end of the contracting or collapsing rod 14. The outer end of the rod 14 is held in its sleeve contracting position by means of the yoke 16, which is removable, and is provided with the openings 21, 22 and 23, forming seats for receiving the rods 9, 10 and 14, respectively, as shown in Figs. 9 and 10. The right hand ends of the rods 9 and 10 are preferably tapered or beveled to permit the easy introduction of the sleeve between them, and the easy application of the yoke 16 upon them; and both ends of the contracting or collapsing rod 14 are preferably tapered and rounded to permit of ready entrance into their seats in the yokes 15 and 16.

The operation of this apparatus is as follows:—A sleeve 8 is inserted between the rods 9 and 10 as shown in Figs. 2 and 3. Then the collapsing rod 14 is applied inside of the sleeve, as shown by dot-and-dash lines in Fig. 15, and is carried laterally, in the general path indicated in that figure by the dot and dash line 26, to and into its seat 18, thus coiling the free portion of the sleeve upon and around the rods 9 and 10, and thereby contracting it to the condition shown in Figs. 9, 10 and 16, in which the rod 14 rests in the seat 18. Figs. 9 and 10 show the yoke 16 applied to the outer ends of the rods to hold them in the tube contracting position, in which position the gasket tube 5 is slipped over the sleeve. The yoke 16 and the rod 14 are then removed, permitting the sleeve and gasket tube to open approximately as shown in Fig. 17, whereupon it is removed from the rods 9 and 10, and may expand still further as shown in Fig. 18, this being determined by the relative sizes and elasticity of the tube and sleeve. At this point the tube and sleeve are taken to other apparatus forming no part of the present invention, in which the assembled tube and sleeve are expanded circumferentially; and settled upon a mandrel, like the mandrel 6, with the gasket tube material uniformly distributed and free from uneven local strains, particularly in a lengthwise direction. Thus the idea embodied in the present invention, of assembling the two flexible and elastic members without uneven strains is consistently carried forward in the subsequent manufacture, resulting in gaskets which are uniform in cross section.

After the operation of cutting the gaskets, the sleeve 8 and its cut gaskets are bodily removed from the mandrel, preferably by inflating and expanding the sleeve, and are placed upon the present apparatus, as shown in Figs. 24 and 25, with the rod 10 inside of the sleeve and the rod 9 between the sleeve and the inner sides of the gaskets. Then the contracting rod 14 is inserted, as shown by the dot-and-dash line in Fig. 20, and is carried laterally over to the position shown in Fig. 1, at which position the rod is inserted in its seat 18 in the yoke 15 and the yoke 16 is again applied, as shown in Figs. 9 and 10. This operation coils the sleeve again to a contracted condition, leaving the gaskets 7 entirely free to be removed wholesale, all at one movement if desired. Prior to removing the gaskets from the sleeve it may be found desirable to run a rod or string 30 through them to tie or otherwise secure them together, and especially in case of gaskets which are not alike on both sides, to keep them all facing in the same direction. As shown in Fig. 21, the collapsing of the sleeve leaves ample room for threading a string or rod through a long row of gaskets. Having thus removed one set of cut gaskets 7 from the sleeve 8, another gasket tube 5 may be placed in position while the sleeve remains coiled as shown in Fig. 21, the operations being thus repeated for each successive gasket tube.

In order to allow for different sizes of sleeves, or for contracting the sleeves to differing extents, additional seats like the seat 19 may be provided in the yoke 15, the yoke 16 being adapted either in shape, or by means of additional holes, to hold the outer end of the contracting rod 14 in a corresponding position. In many other ways which will occur to those skilled in this art, the invention may be modified or extended to suit different requirements and conditions of service.

I claim as my invention:—

1. The combination with means for supporting a flexible tubular sleeve, of means for contracting the sleeve by disposing its walls in undulatory contour.

2. The combination in apparatus for assembling and disassembling flexible tubes, of means for supporting one of the tubes, and means for coiling the walls of the tube in undulatory and contracted contour.

3. The combination, in apparatus for mounting flexible tubes upon the outside of flexible sleeves of a larger diameter, of means for supporting the sleeve, means for coiling the walls of the sleeve in undulatory and contracted contour, and means for securing the coiling means to hold the sleeve in its contracted condition.

4. The combination in apparatus for mounting flexible tubes upon the outside of flexible sleeves of a larger diameter, of a standard provided with projecting members for receiving the wall of the sleeve between them, a movable member for contracting the tube, and a receiving seat appurtenant to the standard for holding the movable member in its sleeve-contracting position.

5. The combination in apparatus for mounting flexible tubes upon the outside of flexible sleeves of a larger diameter, of a standard provided with projecting members for receiving the wall of the sleeve between them, a movable member for contracting the tube, and means for holding the opposite ends of the movable member in its tube-contracting position.

6. The combination in apparatus for assembling and disassembling flexible sleeves and gasket tubes, of a standard provided with projecting holding members extending longitudinally on the inner and outer sides respectively of the sleeve, a movable contracting member also extending longitudinally of the sleeve for contracting the sleeve circumferentially, and means including a removable yoke for supporting the ends of the contracting member in its sleeve-contracting position.

7. The combination in apparatus for assembling and disassembling gasket tubes, and their flexible sleeves, of a standard provided with sleeve-holding members extending longitudinally of the sleeve, one on each side of the wall thereof, a movable contracting member also extending longitudinally of the sleeve, a yoke appurtenant to the standard, and a removable yoke at the other end of the sleeve for securing the said movable member in its contracting position.

In testimony whereof I have signed my name to this specification in the presence of two subscribing witnesses.

JOSEPH MERRITT.

Witnesses:
  NELLIE PHOENIX,
  CAROLINE M. BRECKLE.